(12) United States Patent
Kawara

(10) Patent No.: US 11,436,733 B2
(45) Date of Patent: Sep. 6, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Satoshi Kawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 16/864,293

(22) Filed: May 1, 2020

(65) Prior Publication Data
US 2020/0357121 A1 Nov. 12, 2020

(30) Foreign Application Priority Data
May 8, 2019 (JP) .............................. JP2019-088374

(51) Int. Cl.
| | |
|---|---|
| *G06T 7/11* | (2017.01) |
| *G06T 7/13* | (2017.01) |
| *H04N 1/00* | (2006.01) |
| *G06V 30/146* | (2022.01) |
| *G06V 30/10* | (2022.01) |

(Continued)

(52) U.S. Cl.
CPC .................. *G06T 7/11* (2017.01); *G06T 7/13* (2017.01); *G06V 30/1478* (2022.01); *G06V 30/413* (2022.01); *G06V 30/414* (2022.01); *H04N 1/00816* (2013.01); *G06T 2207/10008* (2013.01); *G06T 2207/20132* (2013.01); *G06T 2207/30176* (2013.01); *G06V 30/10* (2022.01)

(58) Field of Classification Search
CPC ............ G06T 7/11; G06T 2207/10008; G06K 9/3283; G06K 9/00456; G06K 2209/01; H04N 1/00816
See application file for complete search history.

(56) References Cited

U.S. PATENT DOCUMENTS

| | | | | |
|---|---|---|---|---|
| 2001/0014183 A1* | 8/2001 | Sansom-Wai | ........ | H04N 1/3878 382/289 |
| 2005/0238252 A1* | 10/2005 | Prakash | .................... | G06T 7/11 382/289 |

(Continued)

FOREIGN PATENT DOCUMENTS

| | | |
|---|---|---|
| JP | 2003-338920 A | 11/2003 |
| JP | 2017-103593 A | 6/2017 |

*Primary Examiner* — Nancy Bitar
(74) *Attorney, Agent, or Firm* — Venable LLP

(57) ABSTRACT

The image processing apparatus includes a reading unit configured to read a document and generate a scanned image, a dividing unit configured to analyze a distribution of constituent pixels of the scanned image and divide the scanned image based on a document component, an obtaining unit configured to obtain an inclination of a predetermined area among areas into which divided by the dividing unit, a classifying unit configured to classify the predetermined area into a predetermined area group based on the obtained inclination of the predetermined area, a setting unit configured to set a circumscribed rectangle encompassing the predetermined area included in the predetermined area group, a specifying unit configured to specify an area whose feature amount changes in the scanned image outward from the circumscribed rectangle as a document area, and a cropping unit configured to crop the specified document area as a document image.

8 Claims, 7 Drawing Sheets

(51) Int. Cl.
*G06V 30/413* (2022.01)
*G06V 30/414* (2022.01)

(56) References Cited

U.S. PATENT DOCUMENTS

| | | | |
|---|---|---|---|
| 2006/0251339 A1* | 11/2006 | Gokturk | G06K 9/46 |
| | | | 382/305 |
| 2012/0106844 A1* | 5/2012 | Ramachandrula | G06K 9/3283 |
| | | | 382/173 |
| 2017/0155792 A1 | 6/2017 | Mizude et al. | |
| 2017/0171407 A1* | 6/2017 | Akiyama | G06K 9/348 |
| 2017/0171428 A1* | 6/2017 | Kawano | H04N 1/00737 |
| 2019/0311227 A1* | 10/2019 | Kriegman | G06K 9/00442 |
| 2020/0250415 A1* | 8/2020 | Torres | G06K 9/4604 |

* cited by examiner

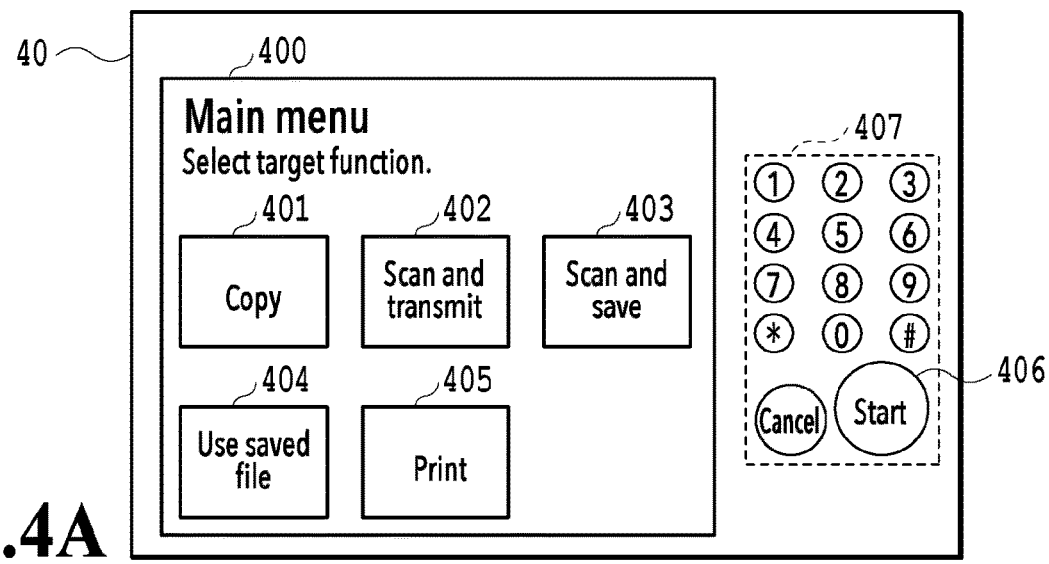
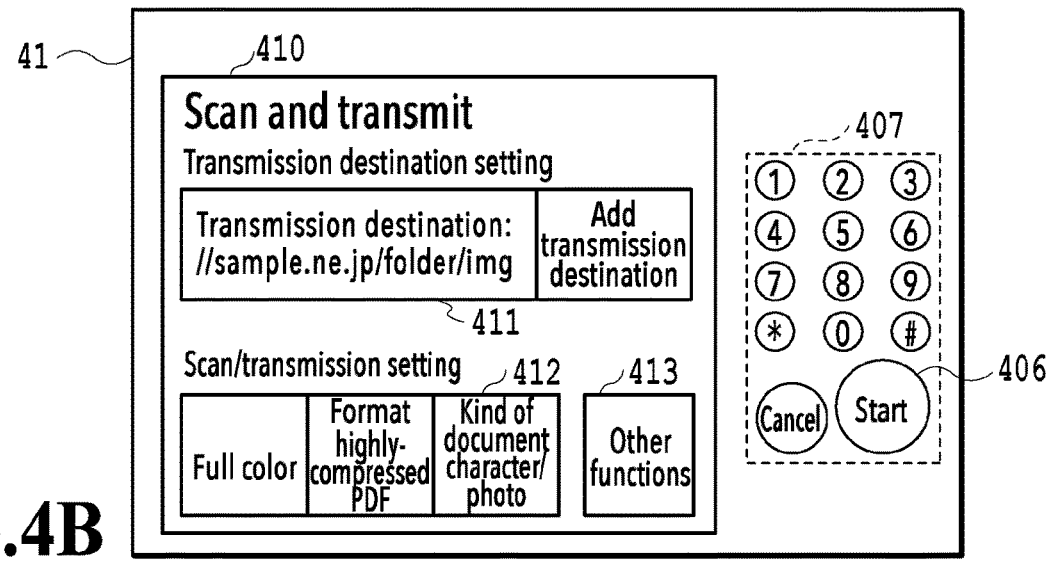
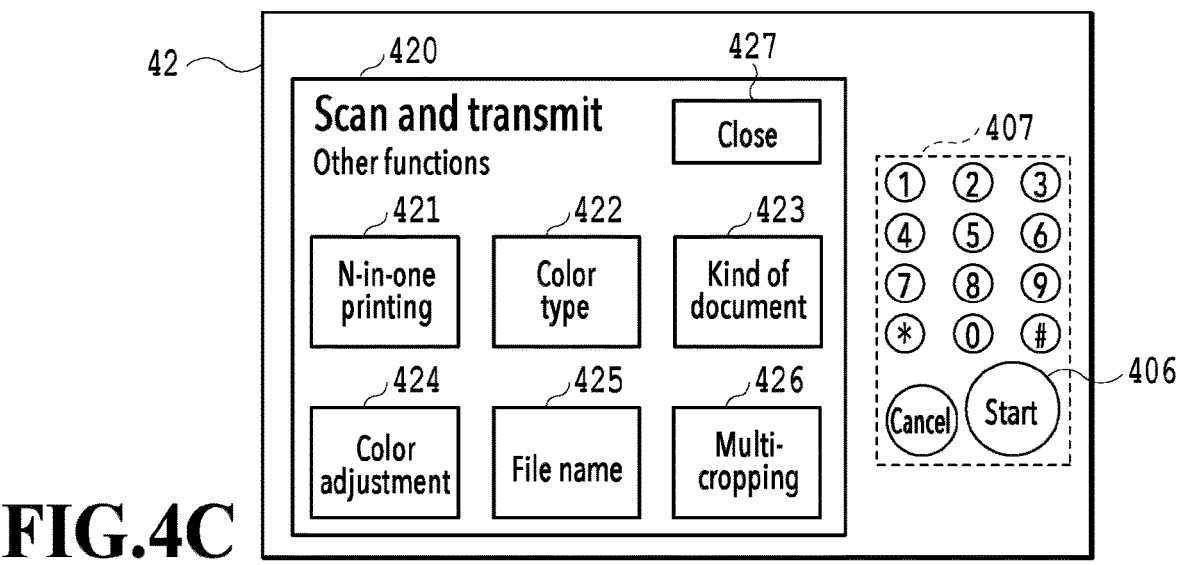

FIG.5

ABC STORE

Date June 16, 2018

☎: 05-1234-5678

| potato chips | x1 | 120 yen |
| ice cream | x1 | 100 yen |
| juice | x1 | 150 yen |

Subtotal 370 yen
Tax(8%) 30 yen
Total 400 yen

*ABCSTORE*

Receipt

Date June 6, 2018

Basic fare ¥ 2,760 yen

Total ¥ 2,760 yen

Thank you for your ride.
The above is paid

Aiueo Transportation (Inc.)
Aiueo business office

TEL: 06-1234-5678

Iroha vegetable
and fruit shop
Iroha Oh-dori ten
Telephone number 03-1234-6789
June 20, 2018 (Wed.)

| pumpkin | x1 | 238 yen |
| mandarin orange M | x1 | 398 yen |
| pickled takana 298 x2 | | 596 yen |
| bean curd | x1 | 98 yen |
| milk special sale 150 x2 | | 300 yen |
| taka-no-tsume | x1 | 108 yen |
| broccoli | x1 | 198 yen |

Subtotal 1,909 yen
Tax(8%) 152 yen
Total 2,061 yen

Thank you for your purchase.

Vegetable and fruit special
sale every Wednesday

Register No: 0002  Nanauji

IMAGE PROCESSING APPARATUS, IMAGE PROCESSING METHOD AND STORAGE MEDIUM

BACKGROUND OF THE INVENTION

Field of the Invention

The present invention relates to a technique to crop an area corresponding to a document from a scanned image of the document.

Description of the Related Art

Conventionally, the multi-cropping processing is known, in which a plurality of documents of non-standardized size, such as a receipt, a business card, and a card, are arranged side by side or one on top of another on a document table of a scanner, then those are read en bloc, and the image of each document is cropped from a scanned image thus generated.

Note that the current multi-cropping processing premises that the background color of a processing-target image is black. Because of this, even though a document on which a character or image is printed on a white sheet, such as a receipt and a business card, is read in the state where the document table cover of the scanner is closed and the multi-cropping processing is performed for the scanned image thus generated, there is a case where the edge of the document cannot be detected. Consequently, a method for solving the trouble such as this, that is, a method of making it easy to detect the edge of a document has been disclosed.

Japanese Patent Laid-Open No. 2003-338920 has disclosed a method of making it easy to detect the edge of a document by reading a document placed on the document table in the state where the document is covered with a black sheet and the document table cover of the scanner is closed so that the area other than the document is black. Further, Japanese Patent Laid-Open No. 2017-103593 has disclosed a method of making it easy to detect the edge of a document by reading a document in the state where the document table cover is open so that the portion at which no document is placed is output black.

Note that with the method disclosed in Japanese Patent Laid-Open No. 2003-338920, it is necessary for a user to cover the document with a black sheet, and therefore, this requires time and effort (burden) of a user. Further, with the method disclosed in Japanese Patent Laid-Open No. 2017-103593, a document is read in the state where the document table cover is open, and therefore, the reading is affected by the environmental light (indoor illumination and the like), and therefore, there is such a problem that the image quality of the scanned image is degraded. In addition, with the method disclosed in Japanese Patent Laid-Open No. 2017-103593, it is not possible to press the document by the weight of the document table cover, and therefore, the document floats somewhat from the document table and a distortion occurs in the scanned image due to this.

SUMMARY OF THE INVENTION

The present invention provides a technique to crop an area corresponding to a document with a high accuracy from a scanned image of the document as well as reducing the burden of a user.

The image processing apparatus according to one aspect of the present invention comprises: a reading unit configured to read a document and generate a scanned image; a dividing unit configured to analyze a distribution of constituent pixels of the scanned image and divide the scanned image based on a document component; an obtaining unit configured to obtain an inclination of a predetermined area among areas into which divided by the dividing unit; a classifying unit configured to classify the predetermined area into a predetermined area group based on the obtained inclination of the predetermined area; a setting unit configured to set a circumscribed rectangle encompassing the predetermined area included in the predetermined area group; a specifying unit configured to specify an area whose feature amount changes in the scanned image outward from the circumscribed rectangle as a document area; and a cropping unit configured to crop the specified document area as a document image.

Further features of the present invention will become apparent from the following description of exemplary embodiments with reference to the attached drawings.

BRIEF DESCRIPTION OF THE DRAWINGS

FIG. 4A to FIG. 4F are each a diagram showing a UI that is displayed on a display/operation unit;

FIG. 5 is a diagram showing a state where documents are placed on a document table.

DESCRIPTION OF THE EMBODIMENTS

In the following, an embodiment of the present invention is explained with reference to the drawings. The following embodiment is not intended to limit the present invention, and all combinations of features explained in the present embodiment are not necessarily indispensable to the solution of the present invention.

(System Configuration)

Figure 1:
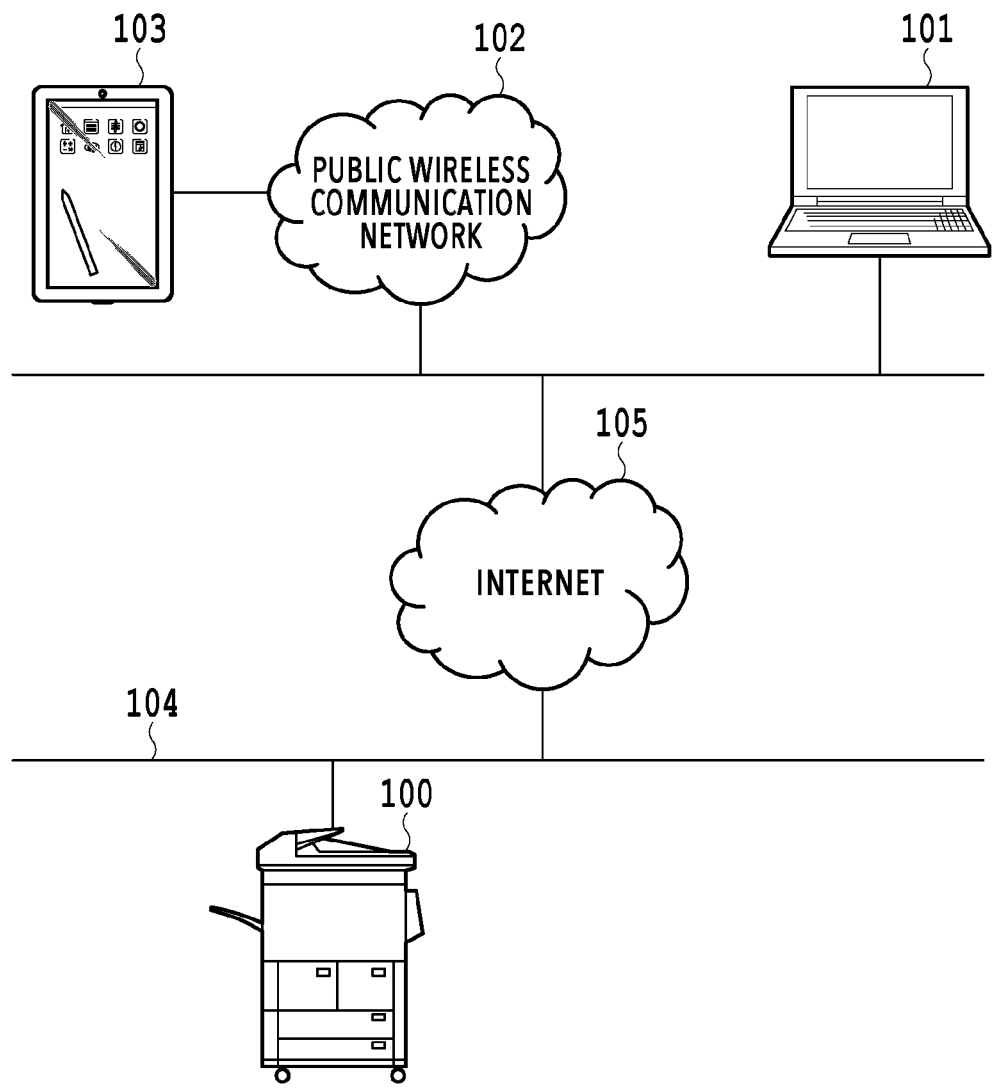
FIG. 1 is a diagram showing an entire configuration of a system.

FIG. 1 is a diagram showing the entire configuration of a system according to the present embodiment. As shown in FIG. 1, an image processing apparatus 100 is connected to an internet 105 so as to be capable of communicating with an external apparatus (information processing apparatus) 101, such as a PC or a server, and a mobile terminal 103. The external apparatus 101 is connected to a LAN 104, such as Ethernet (registered trademark) and a wireless LAN (Local Area Network), and further connected to the internet 105. The mobile terminal 103 is connected to the internet 105 through a public wireless communication network 102 or the like. The above-described configuration may be a configuration including one of the external apparatus 101 and the mobile terminal 103, or may be a configuration including only the image processing apparatus 100 by encompassing the functions of the external apparatus 101 and the mobile terminal 103 in the image processing apparatus 100.

The image processing apparatus 100 is a multifunction peripheral having the operation unit, the scanner unit, and the printer unit. In the present embodiment, the image processing apparatus 100 is made use of as a scan terminal that reads a plurality of documents, such as a business card, a driver's license, a postcard, and a receipt. Further, the image processing apparatus 100 performs multi-cropping processing to extract a document image for each document from a scanned image acquired by reading documents. Furthermore, the image processing apparatus 100 performs OCR (Optical Character Recognition) processing or the like for the extracted document image and generates metadata that can be made use of again.

In the present embodiment, explanation is given by taking the scan-target image as an image obtained by scanning a plurality of receipts at the same time and supposing that the metadata is the total money amount, the date of issue, and the telephone number of the issuing shop within each document image (receipt image). Further, the image processing apparatus 100 has the display unit for displaying an error notification, an instructions notification, and the like, and the operation unit for performing the operation, such as the scan operation and the setting operation. The operation unit is a touch panel, a hard button, and the like.

The external apparatus 101 displays and saves the document image, the metadata, and the like, which are generated in the image processing apparatus 100. It may also be possible for the external apparatus 101 to perform the multi-cropping processing and the metadata generation processing, which are performed in the image processing apparatus 100. Further it is also possible for the external apparatus 101 to communicate with an external storage, such as the cloud and the server, and transmit the saved document image and metadata to the external storage.

(Hardware Configuration of the Image Processing Apparatus 100)

Figure 2:
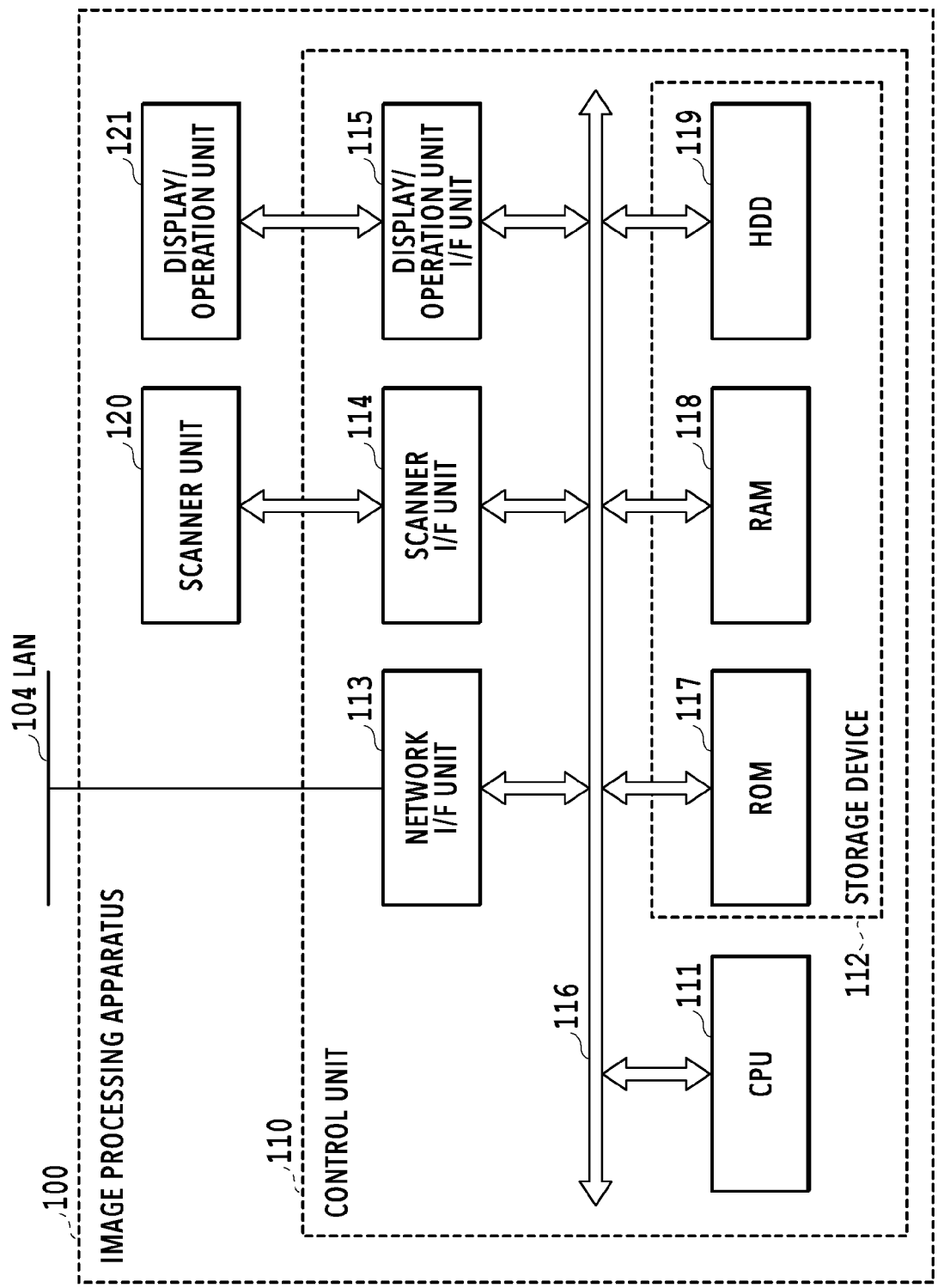
FIG. 2 is a diagram showing a hardware configuration of an image processing apparatus.

FIG. 2 is a diagram showing the hardware configuration of the image processing apparatus 100. As shown in FIG. 2, the image processing apparatus 100 comprises a control unit 110, a scanner unit 120, and a display/operation unit 121.

The control unit 110 controls the operation of the entire image processing apparatus 100. The control unit 110 has a CPU 111, a storage device 112, a network interface (I/F) unit 113, a scanner I/F unit 114, and a display/operation unit I/F unit 115 and these units are connected so as to be capable of communicating with one another via a system bus 116.

The CPU (Central Processing Unit) 111 reads control programs stored in the storage device 112 and performs various kinds of control, such as reading control and transmission control. The storage device 112 stores, the above-described control programs, images, metadata, setting data, processing results data, and the like. The storage device 112 has a ROM 117 that is a nonvolatile memory, a RAM 118 that is a volatile memory, and an HDD 119 that is a large-capacity storage area.

The ROM (Read Only Memory) 117 is used as a storage area storing the control programs and the like. The CPU 111 controls the image processing apparatus 100 by reading the control programs stored in the ROM 117 and executing the control programs. The RAM (Random Access Memory) 118 is used as a temporary storage area, such as a main memory and a work area, of the CPU 111. The HDD (Hard Disk Drive) 119 is used as a large-capacity storage area storing images, metadata, and the like.

The network I/F unit 113 is an interface that connects the control unit 110 (that is, the image processing apparatus 100) to the LAN (Local Area Network) 104. The network I/F unit 113 transmits images to the external apparatuses connected to the LAN 104, such as the external apparatus 101 and the mobile terminal 103, receives various kinds of information from the external apparatuses connected to the LAN 104, and so on.

The scanner I/F unit 114 is an interface that connects the scanner unit 120 and the control unit 110. The scanner unit 120 generates a scanned image by reading an image placed on the document table and inputs the generated scanned image to the control unit 110 via the scanner I/F unit 114.

The display/operation unit I/F unit 115 is an interface that connects the display/operation unit 121 and the control unit 110. The display/operation unit 121 is provided with hard keys 407 (FIG. 4A), such as a ten-key, a Start key 406 (FIG. 4A), and a Cancel key, and a liquid crystal display unit having the touch panel function. Here, the Start key is a button for starting processing, such as copy and scan, and the Cancel key is a button for temporarily terminating or aborting the processing being performed by the image processing apparatus 100.

In addition, although some of the image processing apparatuses 100 comprise a printer unit or the like, the printer unit or the like is not used in the present embodiment, and therefore, explanation thereof is omitted here. As above, it is possible for the image processing apparatus 100 according to the present embodiment to provide the image processing function by the above-described hardware configuration.

(Procedure of Processing of "Scan and Transmit" Function)

Figure 3:
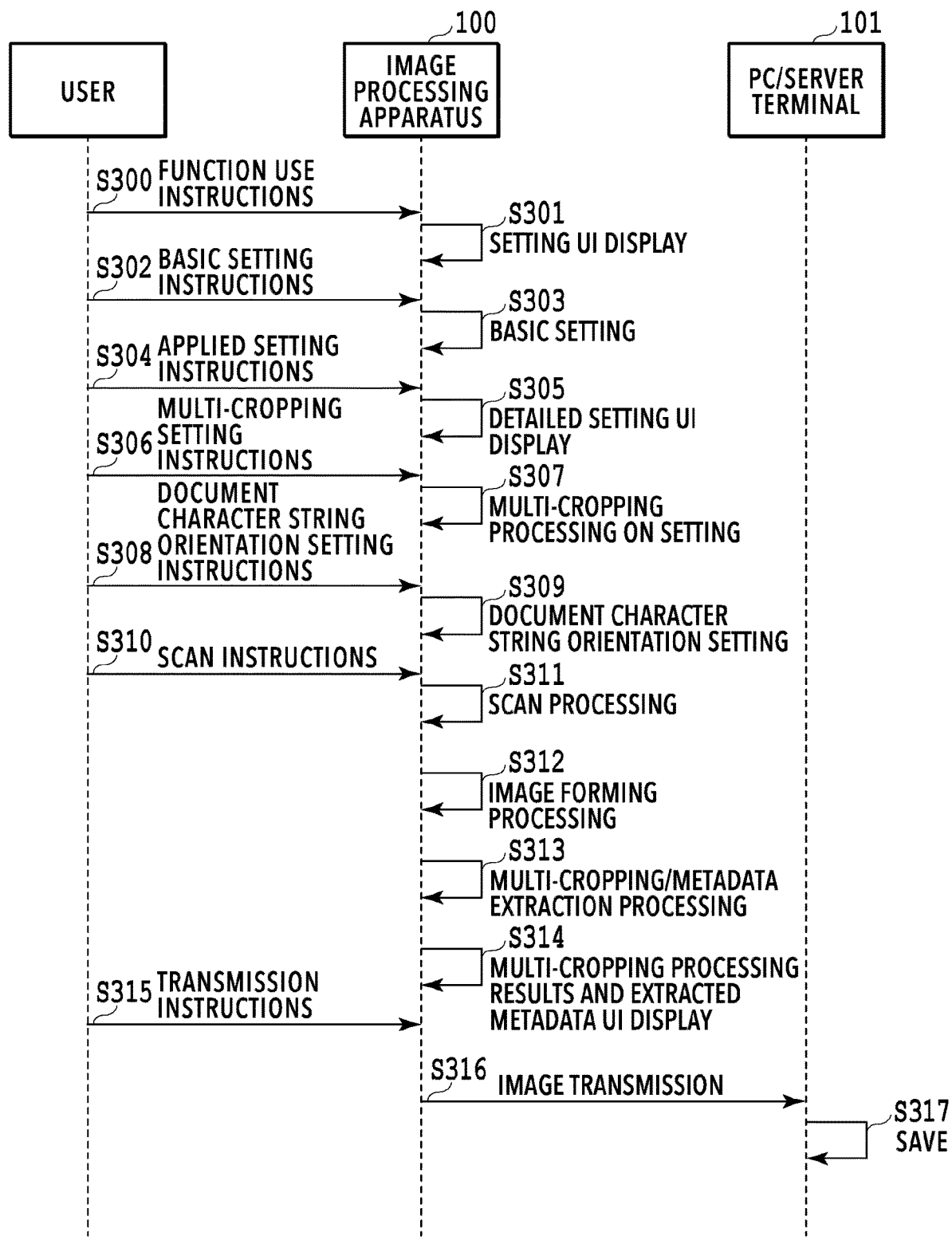
FIG. 3 is a diagram showing a processing sequence of the image processing apparatus.

Next, by using FIG. 3, the sequence for performing the multi-cropping processing is explained. The multi-cropping processing here is implemented by the CPU 111 of the image processing apparatus 100 reading the control program stored in the storage device 112 and executing the read control program. It is assumed that symbol "S" in the explanation of the sequence diagram represents a step. This also applies to the explanation of the following flowchart.

At S300 of function use instructions, a user selects a "Scan and transmit" function on a main menu UI (User Interface) that is displayed on the display/operation unit 121. The image processing apparatus 100 receives the selection of the "Scan and transmit" function via the display/operation unit 121.

Here, the "Scan and transmit" function is a function to scan a document by an image processing apparatus connected to a network, such as a LAN, and transmit the acquired scanned image to an external apparatus. More specifically, a function to perform image processing, format conversion processing, metadata extraction processing, or the like, for the scanned image generated by reading with a scanner and transmit the scanned image to the folder of a server specified by a user or to a predetermined address by an electronic mail.

Figure 4D:
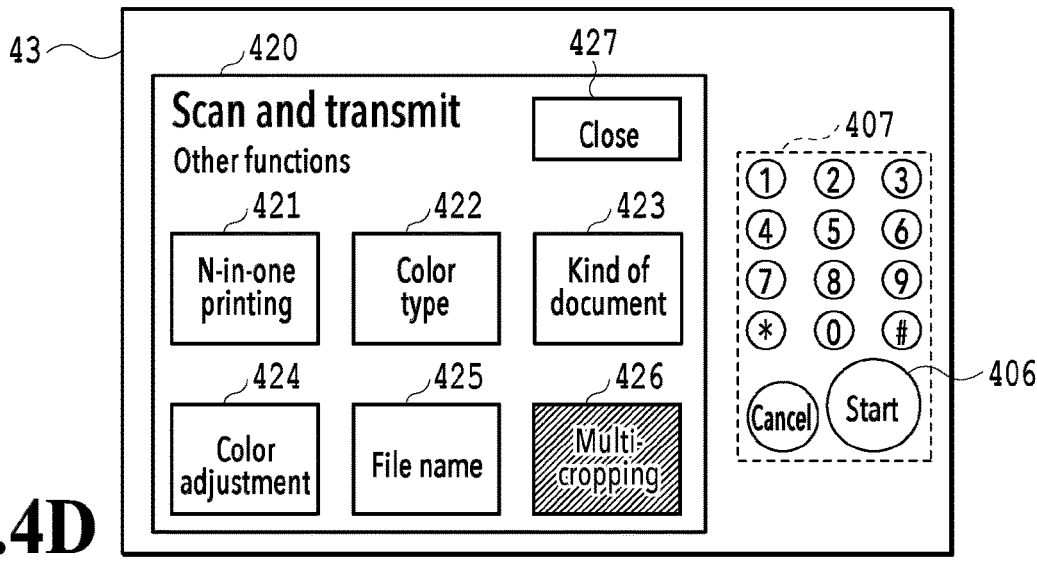

Further, here, by using FIG. 4A to FIG. 4F, the UI that is displayed on the display/operation unit 121 is explained. FIG. 4A is a main menu UI 40 that is displayed on the display/operation unit 121. The main menu UI 40 is a screen that displays functions that can be performed by the image processing apparatus 100 as buttons. On the main menu UI 40, for example, a "Copy" function button 401, a "Scan and transmit" function button 402, a "Scan and save" function button 403, a "Use saved file" function button 404, a "Print" function button 405, and the like are displayed.

The image processing apparatus 100 receives the function (processing) that a user desires to perform via the main menu UI 40. Here, at S300 of function use instructions, a user performs the tap operation to the "Scan and transmit" function button 402 and selects the "Scan and transmit" function, and therefore, the image processing apparatus 100 receives the "Scan and transmit" function.

Upon receipt of the "Scan and transmit" function, the display/operation unit 121 of the image processing apparatus 100 displays a setting screen of the "Scan and transmit" function at S301 of setting UI display. FIG. 4B is a "Scan and transmit" setting UI 41 that is displayed on the display/ operation unit 121. As shown in FIG. 4B, the "Scan and transmit" setting UI 41 shows the states of various settings of the "Scan and transmit" function.

On the "Scan and transmit" setting UI 41, for example, "Transmission destination" 411 is a button for setting the address of the transmission destination to which the scanned image generated by a scan is transmitted. In a case where a user performs the tap operation to the "Transmission destination" 411, a transmission destination setting screen, not shown schematically, is displayed and it is possible for a user to input (set) the transmission destination of the scanned image. In the present embodiment, in order to set the transmission destination of the scanned image to the external apparatus 101, a user inputs the URL (Uniform Resource Locator), the IP address, or the like, of the external apparatus 101. By performing the setting as described above, the document image for which the multi-cropping processing has been performed and the metadata extracted from the document image are transmitted to the external apparatus 101.

A "Scan/transmission setting" 412 is a button for setting the color of the scanned image to be generated, the format of the image file to be generated, and the state of the kind of document. Further, an "Other functions" 413 is a button for setting an applied function not displayed on the "Scan and transmit" setting UI 41.

At S302 of basic setting instructions, a user instructs the image processing apparatus 100 to set items that can be set on the "Scan and transmit" setting UI 41. The image processing apparatus 100 receives the setting instructions in the "Scan and transmit" function via the display/operation unit 121. The setting instructions that are received at S302 of basic setting instructions are, for example, the color setting of the scanned image to be generated, the format selection of the image file to be generated, and the like, as described above. In a case where the tap operation is performed on the "Transmission destination" 411 and the "Scan/transmission setting" 412, the image processing apparatus 100 receives the input of the setting item corresponding to each button.

At S303 of basic setting, the image processing apparatus 100 stores the setting value of the basic setting of the "Scan and transmit" function instructed by a user at S302 in the RAM 118 of the image processing apparatus 100.

Next, at S304 of applied setting instructions, a user selects the "Other functions" 413 by performing the tap operation. At S305 of detailed setting UI display, the image processing apparatus 100 receives the selection of the "Other functions" 413 by a user and displays a screen for setting the applied function on the display/operation unit 121.

FIG. 4C is an "Other functions" setting UI 42 for setting an applied function. As shown in FIG. 4C, the image processing apparatus 100 displays buttons for setting the various applied functions of the "Scan and transmit" function that can be performed by the image processing apparatus 100 on the "Other functions" setting UI 42. On the "Other functions" setting UI 42, for example, an "N-in-one printing" button 421, a "Color type" button 422, a "Kind of document" button 423, a "Color adjustment" button 424, a "File name" button 425, a "Multi-cropping" button 426, and the like, are displayed.

Among these buttons, the "Multi-cropping" button 426 is a button for giving instructions to perform processing to crop the document image corresponding to each document from the scanned image generated by reading documents and extract the metadata within the document image. As described above, in the present embodiment, the document image (scan-target image) is a receipt image and the metadata is a total money amount and the like included within each document image (receipt image). Further, although on the "Other functions" setting UI 42, the setting item that can be set on the "Scan and transmit" setting UI 41 is also displayed in a duplicate manner, it may also be possible to display the setting items except for the setting item that is displayed in a duplicate manner on the "Other functions" setting UI 42.

At S306 of multi-cropping setting instructions, a user selects the "Multi-cropping" button 426 on the "Other functions" setting UI 42 by performing the tap operation. The image processing apparatus 100 receives the setting instructions on the "Other functions" setting UI 42 via the display/operation unit 121. In accordance with that the "Multi-cropping" button 426 is selected by a user, the image processing apparatus 100 sets a multi-cropping processing flag indicating that the multi-cropping processing is performed to ON at S307 of multi-cropping processing ON setting. The multi-cropping processing flag is stored in the RAM 118.

At S307 of multi-cropping processing ON setting, the image processing apparatus 100 causes the display/operation unit 121 to display a screen 420 indicating that multi-cropping has been selected, which is shown in FIG. 4D. As described above, in a case where the "Multi-cropping" button 426 is selected by a user, the image processing apparatus 100 causes a screen indicating that the multi-cropping processing is set to ON by reversing the color of the "Multi-cropping" button 426 on the "Other functions" setting UI 42 to be displayed.

Figure 4E:
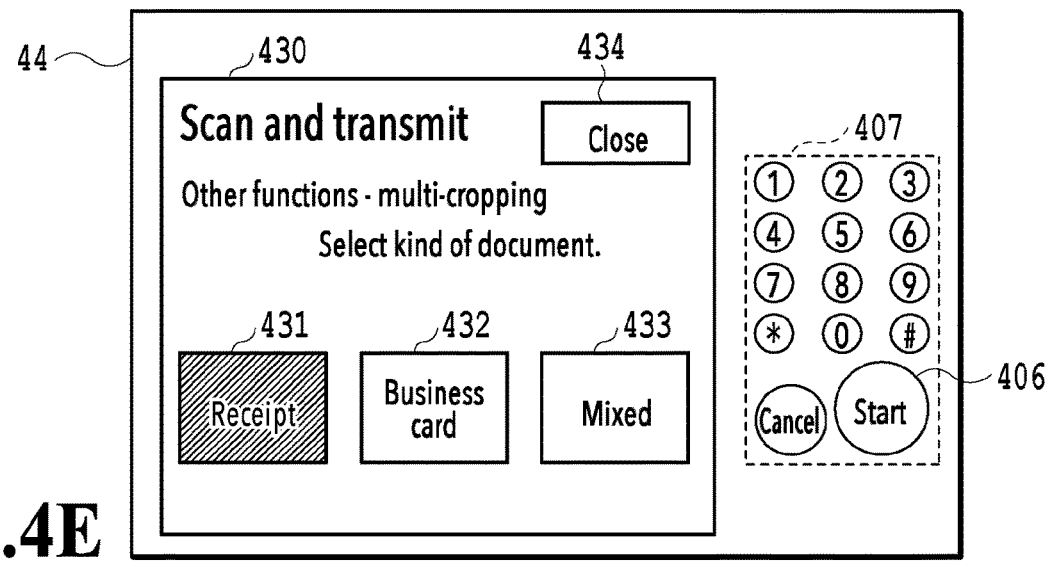

In a case where a user taps the "Multi-cropping" button 426 in the state where the screen 420 indicating that the "Multi-cropping" button 426 has been selected is displayed, as shown in FIG. 4E, a screen 430 for causing a user to set the kind of document is displayed. Here, a "Receipt" button 431 that is set in a case where a receipt is placed on the document table, a "Business card" button 432 that is set in a case where a business card is placed, and a "Mixed" button 433 that is set in a case where a receipt and a business card are placed in a mixed manner are arranged.

At S308 of document character string orientation setting instructions, as described above, in the present embodiment, the "Receipt" button 431 is selected by the tap operation by a user in order to set the document image as the receipt image. In accordance with this operation, at S309 of document character string orientation setting, the image processing apparatus 100 sets the kind of document to "Receipt". The set kind of document (that is, "Receipt") is stored in the RAM 118.

Further, at S309 of document character string orientation setting, the image processing apparatus 100 causes the display/operation unit 121 to display a screen indicating that the kind of document is set to "Receipt" by reversing the color of the "Receipt" button 431 as shown in FIG. 4E. In a case where a user selects a "Close" button 434 by performing the tap operation in the state where the screen 430 indicating that the "Receipt" button 431 has been selected, the display/operation unit 121 displays the "Other functions" setting UI 42. Further, in a case where a user selects a "Close" button 427 by performing the tap operation in the state where the "Other functions" setting UI 42 is displayed, the display/operation unit 121 displays the "Scan and transmit" setting UI 41.

At S310 of scan instructions, a user presses down the Start key 406. By the Start key 406 being pressed down, the image processing apparatus 100 is instructed to start reading of a document and the image processing apparatus 100 performs various settings for scanning the document in the RAM 118 and starts preparations of the document reading processing in accordance with the instructions.

At S311 of scan processing, the image processing apparatus 100 reads a document placed on the document table by driving the scanner unit 120. At S312 of image forming processing, the image processing apparatus 100 converts the signal value acquired by reading the document with scanner unit 120 into an image (scanned image) in the bitmap format that can be handled in the image processing. For example, at S312 of image forming processing, the image processing apparatus 100 converts the luminance signal value input from the scanner unit 120 into an 8-bit digital signal and stores the 8-bit digital signal in the HDD 119 as scanned image data.

Here, by using FIG. 5, the state where a document (receipt) is placed on the document table is described. FIG. 5 shows the state where a plurality of receipts is placed on the document table. Here, it is assumed that three receipts are arranged on the scanner unit 120 capable of reading the area of A3 size. In FIG. 5, a variety of kinds of receipt (that is, a variety of sizes, aspect ratios, and designs) whose size is comparatively small are placed. Further, a user places a receipt facedown on the document table, and therefore, usually, the state is brought about where the receipts are placed in a disorderly manner as shown in FIG. 5. The number of receipts to be placed on the document table and the arrangement thereof are not limited to these.

At S313 of multi-cropping/metadata extraction processing, the image processing apparatus 100 acquires the scanned image stored in the HDD 119, crops each receipt image (each document image) from the acquired scanned image, and further, extracts metadata from each receipt. Then, the image processing apparatus 100 compresses each document image after being cropped and stores each compressed document image and the metadata in the HDD 119. In the present embodiment, it is assumed that three items of "total money amount", "date of issue", and "telephone number of the issuing shop" are extracted as the metadata. Details of S313 of multi-cropping/metadata extraction processing will be described later.

Figure 4F:
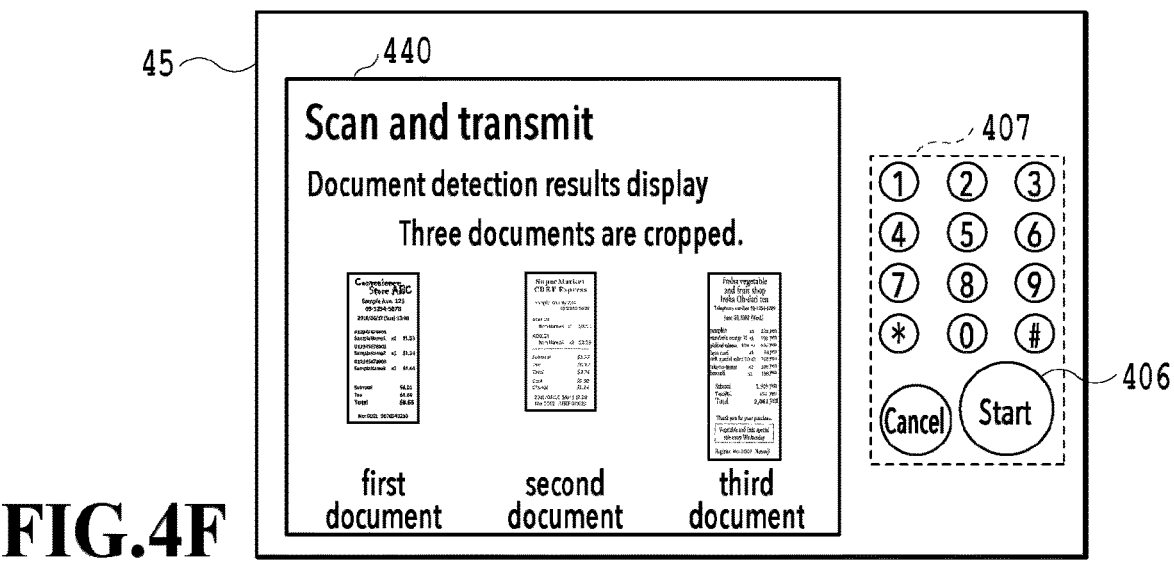

At S314 of multi-cropping processing results and extracted metadata UI display, the image processing apparatus 100 displays each receipt image after the multi-cropping processing and the extracted metadata on the display/operation unit 121. FIG. 4F is a "Document detection results display" UI 45 indicating the results of the multi-cropping processing and the document direction correction processing, which is displayed on the display/operation unit 121. That is, the "Document detection results display" UI 45 is a screen displaying each document image side by side, which is obtained by the multi-cropping processing and the document direction correction processing.

At S315 of transmission instructions, a user checks the receipt image cropping results displayed on the display/operation unit 121 and gives instructions to transmit and save the cropping results (that is, the cropped receipt image). Specifically, a user gives instructions to transmit and save each cropped receipt image to the image processing apparatus 100 by pressing down the Start key 406. Further, at S315 of transmission instructions, the image processing apparatus 100 receives transmission instructions to transmit the receipt image to the external apparatus 101 from a user.

At S316 of image transmission, the image processing apparatus 100 transmits the receipt image after the multi-cropping processing and the metadata to the external apparatus 101. The receipt image that is transmitted to the external apparatus 101 at S316 of image transmission is the image in which the setting value set on the "Scan and transmit" setting UI 41 or the "Other functions" setting UI 42 is reflected.

At S317 of save, the external apparatus 101 saves each receipt image and the metadata corresponding to each receipt image, which are transmitted from the image processing apparatus 100. Here, although it is sufficient for the external apparatus 101 only to save the receipt image, it may also be possible to save the receipt image in an external system, such as an accounting system.

(Procedure of S313 of Multi-Cropping/Metadata Extraction Processing)

Figure 6:
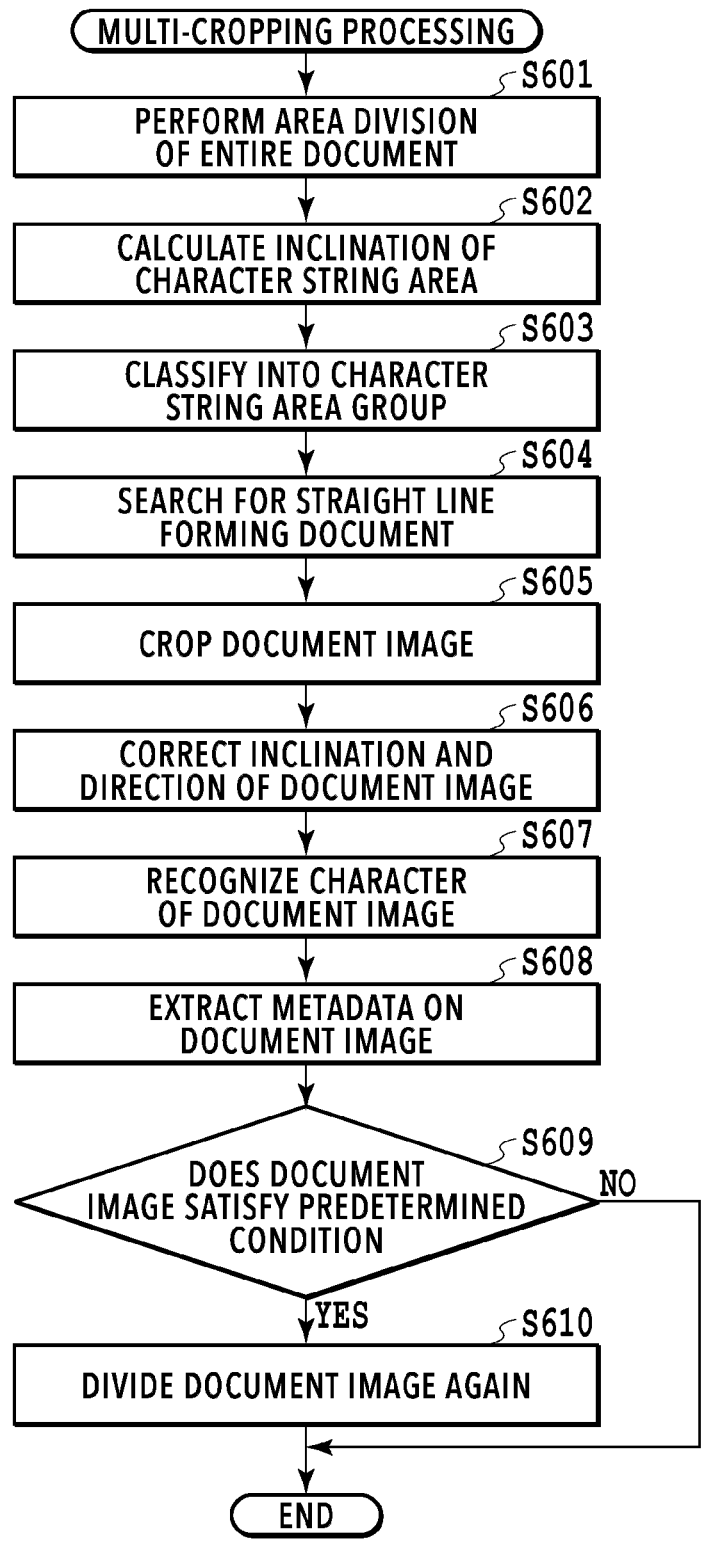
FIG. 6 is a flowchart showing details of multi-cropping/metadata extraction processing.

FIG. 6 is a flowchart showing details of S313 of multi-cropping/metadata extraction processing described above (FIG. 3). The multi-cropping/metadata extraction processing here is implemented by the CPU 111 of the image processing apparatus 100 reading the control program stored in the storage device 112 and executing the read control program.

At S601, the CPU 111 performs area division processing for an entire document. The area division processing is processing to analyze the distribution of pixels for all the constituent pixels within the document and classify which portion of the document image corresponds to which document component. The area division processing is performed as the preprocessing of character recognition (OCR) processing and it is possible to use the prior art for the area division processing. The kinds of document component generally include "character", "photo", "graphics", "ruled line", "table cell", and the like.

In addition, at S601, the CPU 111 pulls out all areas (plurality of areas) corresponding to "character string", which are necessary for the subsequent steps, from the results of the area division processing and stores the coordinates of the pulled out areas corresponding to "character string" in the RAM 118 as the character string area coordinates. Here, the area corresponding to "character string" (hereinafter, referred to as character string area) includes the subelement of the pixels whose document component is determined to be each individual "character".

At S602, the CPU 111 reads the character string area coordinates stored in the RAM 118 at S601 and calculates the inclination of the individual character string area. Here, the inclination of the character string area is calculated (obtained) as the advancing direction of the character string. It is possible to calculate the advancing direction of the character string by using the prior art. For example, as a simple method, it is possible to use a method of forming a straight line connecting the center coordinates of the pixels of "character", which is a subelement", and performing averaging, and the like. The CPU 111 regards the calculated advancing direction of the character string as the inclination of the character string area and adds the inclination of the character string area to the corresponding character string area as additional information, and then, stores the inclination of the character string area in the RAM 118.

At S603, the CPU 111 reads the inclination of the character string area, which is stored in the RAM 118 at S602, and classifies the character string area into a predetermined character string area group according to the inclination (angle) of the character string area. That is, the character string area whose angle (inclination) is regarded as being the same is classified into the same character string area group. Whether or not to regard the angle as being the same is determined by providing a predetermined error threshold value. Further, classification of the character string area into the same character string area group is performed on the condition that character string areas included in one character string area group are adjacent to each other, and whether or not character string areas are adjacent to each other is determined whether the distance between both areas is less than or equal to a threshold value (less than or equal to a distance). After classifying character string areas into character string area groups, the CPU 111 finds a minimum circumscribed rectangle capable of encompassing the character string area included in the character string area group for each character string area group and stores the circumscribed rectangle in the RAM 118.

At S604, the CPU 111 acquires the circumscribed rectangle of each character string area group, which is found at S603, from the RAM 118 and performs processing to search for a straight line (that is, a straight line in a case where a document is formed) whose feature amount on the document image changes outward from the circumscribed rectangle. In the following, this processing is explained supplementally.

First, the CPU 111 detects all the candidates of straight lines that can be detected from the image by using the prior art, such as the Hough transform, which is a general straight line detection method of an image. In a case where this general straight line detection method of an image is used, a number of candidates of unnecessary straight lines are detected, and therefore, it is not possible to determine useful straight lines in the state such as this. Consequently, the CPU 111 determines whether or not an intersection of the detected straight line candidate and the circumscribed rectangle of the character string area group exists (that is, whether or not the straight line candidate and the circumscribed rectangle of the character string area group intersect is determined). Then, among the straight lines detected by using the above-described straight line detection method, only the straight lines on which no intersection exists are left as the final straight line candidates. After that, further, the straight line candidate located outside the circumscribed rectangle of the character string area group, and which is parallel to the circumscribed rectangle and which is the nearest to the circumscribed rectangle, is detected as the straight line whose feature amount on the document image changes. In a case where the straight line whose feature amount on the document image changes is specified, it is only required that the inclination of the side of the circumscribed rectangle and the inclination of the straight line candidate match. The determination of whether or not the inclinations match may be performed by providing a predetermined error threshold value.

In a case where it is possible to detect four straight lines as the straight line candidates in each character string area group, the CPU 111 specifies the area surrounded by those four straight lines as the document area of the receipt. In a case where it is not possible to detect a part or all of the four straight line candidates, the CPU 111 uses the circumscribed rectangle of the character string area group as the alternative of the straight line candidate that cannot be detected. In a case of detecting four straight line candidates for each character string area group (that is, in a case of specifying a document frame), the CPU 111 stores the coordinates of the four vertexes of the document frame in the RAM 118 as a combination.

At S605, the CPU 111 reads the coordinates of the four vertexes of the document frame, which are stored at S604, from the RAM 118 for each character string area group and crops the receipt image from the document image by using the combination of the four coordinates and stores each receipt image in the HDD 119 as each individual receipt image. Because of this, the receipt images are generated so that the number thereof corresponds to the number of document frames specified at S604.

At S606, the CPU 111 reads the cropped receipt image stored in the HDD 119 at S605 and corrects the inclination and the direction of the cropped receipt image by using the prior art. Here, the inclination and the direction of the receipt image are corrected so that the character in the receipt image is erect in each individual receipt image and the character advancing direction is along the horizontal direction with an inclination of zero degrees. The CPU 111 stores the receipt image, which is the correction results, in the HDD 119 again.

At S607, the CPU 111 reads the receipt image stored at S606, performs general OCR processing for each receipt image, and recognizes the character described in the receipt image. In a case where OCR processing is performed, the results of performing the OCR processing are associated with information indicating which character is detected at which coordinate position in the receipt image and stored in the RAM 118.

At S608, the CPU 111 analyzes the results of performing the OCR processing at S607 and searches for an item name (that is, Key). As the item name, for example, "Total" or the like is used frequently in the receipt. In a case where the item name has been searched for from the OCR results, as a value (Value) corresponding to the item name, for example, the numerical value of the money amount is searched for based on the OCR positional information. Specifically, the search is made in accordance with a rule, such as that the numerical value of the money amount is generally printed to the right of or under "Total". Further, it is assumed that the number of item names and the kinds of item name, which are searched for here, are defined in the system according to the purpose of use. Information in which the item name and the numerical value of the money amount, which are searched for, are associated with each other is stored in the RAM 118 in association with each receipt image as metadata.

At S609, the CPU 111 reads the metadata (information relating to the item name and the corresponding numerical value of the money amount) associated with each receipt image, which is stored in the RAM 118 at S608, and then, determines whether or not the metadata satisfies a predetermined determination condition. Specifically, the CPU 111 determines whether or not the item name matches with the number of item names defined to appear in one receipt (that is, whether or not the upper limit number is exceeded) for each receipt image. Then, in a case of determining that the read item name exceeds the upper limit number (Yes at S609), the CPU 111 causes the processing to advance to S610. In the other cases (No at S609), the processing shown in FIG. 6 is terminated.

In a case where the processing advances to S610, because the item name included in the receipt exceeds the upper limit number, the CPU 111 regards the receipt image cropping results as being incorrect and performs the receipt image cropping again. As a case where the item name included in the receipt exceeds the upper limit number, a case is supposed where a large area in which a plurality of receipts is included is cropped as a receipt image corresponding to one receipt. Further, as the cropping that is performed again, it is possible to discuss a method in which the processing is returned to S604 and the threshold value of the matching determination of the inclination and the distance in a case where straight lines are searched for outward from the circumscribed rectangle of the character string area is relaxed, or the like.

As explained above, according to the present embodiment, it is possible to crop an area corresponding to a document with a high accuracy from a scanned image of the document as well as reducing the burden of a user. In the above, although the example is explained in which as the multi-cropping processing, a plurality of receipts (documents) is read, and the documents are cropped individually, the number of documents to be cropped does not necessarily need to be two or more and it is also possible to apply the present embodiment to one document.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to crop an area corresponding to a document with a high accuracy from a scanned image of the document as well as reducing the burden of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088374, filed May 8, 2019, which is hereby incorporated by reference wherein in its entirety.

What is claimed is:

1. An image processing apparatus comprising:
   at least one memory that stores a program; and
   at least one processor that executes the program to perform:
   (1) obtaining a scanned image;
   (2) specifying a plurality of character string areas in the scanned image by analyzing the scanned image;
   (3) obtaining a respective inclination for each of the plurality of character string areas;
   (4) classifying the plurality of character string areas into groups, wherein character string areas whose inclinations are regarded as being identical are classified into a same group; and
   (5) multi-cropping a plurality of document images from the scanned image based on the classified groups,
   wherein the multi-cropping comprises:
   acquiring a circumscribed rectangle for each of the classified groups;
   detecting straight lines from the scanned image;
   specifying, from the detected straight lines, four straight lines corresponding to sides configuring the acquired circumscribed rectangle, wherein each of the four straight lines is parallel to a respective one of sides configuring the acquired circumscribed rectangle and nearer to the circumscribed rectangle; and
   cropping the plurality of document images corresponding to the classified groups from the scanned image based on the four straight lines that are specified for each circumscribed rectangle corresponding to each of the classified groups.

2. The image processing apparatus according to claim 1, wherein the scanned image is generated by reading a plurality of documents placed on a document table of a scanner.

3. The image processing apparatus according to claim 1, wherein in a case where a part or all of the four straight lines cannot be specified, the plurality of document images are cropped by using, in place of the part or all of the four straight lines that cannot be specified, a side configuring the circumscribed rectangle corresponding to a straight line that cannot be detected.

4. The image processing apparatus according to claim 1, wherein the at least one processor further performs control to store the multi-cropped plurality of document images.

5. The image processing apparatus according to claim 1, wherein the at least one processor further performs correction of an inclination of each of the multi-cropped plurality of document images.

6. An image processing apparatus comprising:
   at least one memory that stores a program; and
   at least one processor that executes the program to perform:
   (1) obtaining a scanned image;
   (2) specifying a plurality of character string areas in the scanned image by analyzing the scanned image;
   (3) obtaining a respective inclination for each of the plurality of character string areas;
   (4) classifying the plurality of character string areas into groups, wherein character string areas whose inclinations are regarded as being identical are classified into a same group;
   (5) multi-cropping a plurality of document images from the scanned image based on the classified groups;
   (6) performing correction of an inclination of each of the multi-cropped plurality of document images;
   (7) extracting an item name and a value by performing character recognition for each of the corrected multi-cropped plurality of document images; and
   (8) storing the extracted item name and value in association with each of the corrected multi-cropped plurality of document images.

7. An image processing method comprising:
   obtaining a scanned image;
   specifying a plurality of character string areas in the scanned image by analyzing the scanned image;
   obtaining a respective inclination for each of the plurality of character string areas;

classifying the plurality of character string areas into groups, wherein character string areas whose inclinations are regarded as being identical are classified into a same group; and multi-cropping a plurality of document images from the scanned image based on the classified groups, wherein the multi-cropping comprises:

acquiring a circumscribed rectangle for each of the classified groups;

detecting straight lines from the scanned image;

specifying, from the detected straight lines, four straight lines corresponding to sides configuring the acquired circumscribed rectangle, wherein each of the four straight lines is parallel to a respective one of sides configuring the acquired circumscribed rectangle and nearer to the circumscribed rectangle; and cropping the plurality of document images corresponding to the classified groups from the scanned image based on the four straight lines that are specified for each circumscribed rectangle corresponding to each of the classified groups.

8. A non-transitory computer-readable storage medium storing a program for causing a computer to perform:

obtaining a scanned image;

specifying a plurality of character string areas in the scanned image by analyzing the scanned image;

obtaining a respective inclination for each of the plurality of character string areas;

classifying the plurality of character string areas into groups, wherein character string areas whose inclinations are regarded as being identical are classified into a same group; and multi-cropping a plurality of document images from the scanned image based on the classified groups, wherein the multi-cropping comprises:

acquiring a circumscribed rectangle for each of the classified groups;

detecting straight lines from the scanned image;

specifying, from the detected straight lines, four straight lines corresponding to sides configuring the acquired circumscribed rectangle, wherein each of the four straight lines is parallel to a respective one of sides configuring the acquired circumscribed rectangle and nearer to the circumscribed rectangle; and cropping the plurality of document images corresponding to the classified groups from the scanned image based on the four straight lines that are specified for each circumscribed rectangle corresponding to each of the classified groups.

\* \* \* \* \*